UNITED STATES PATENT OFFICE.

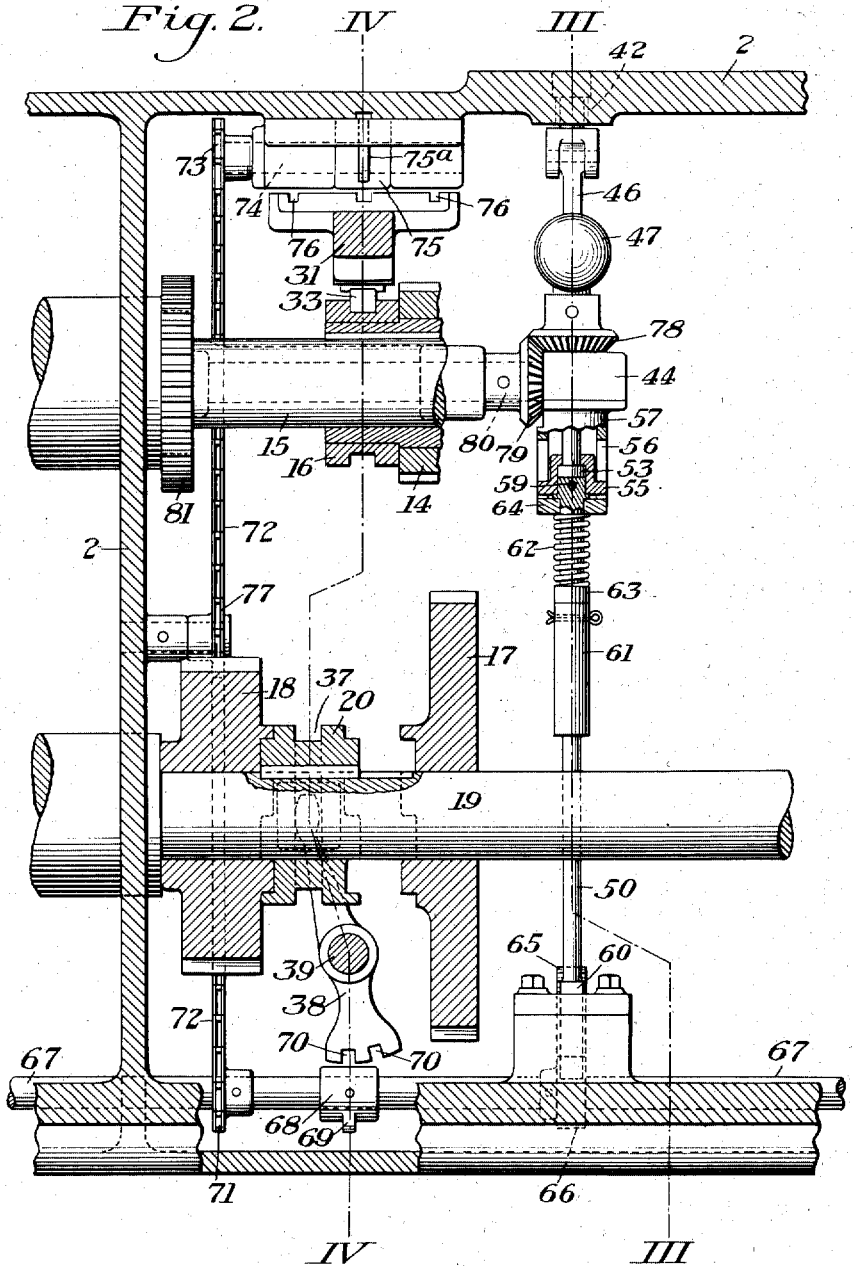

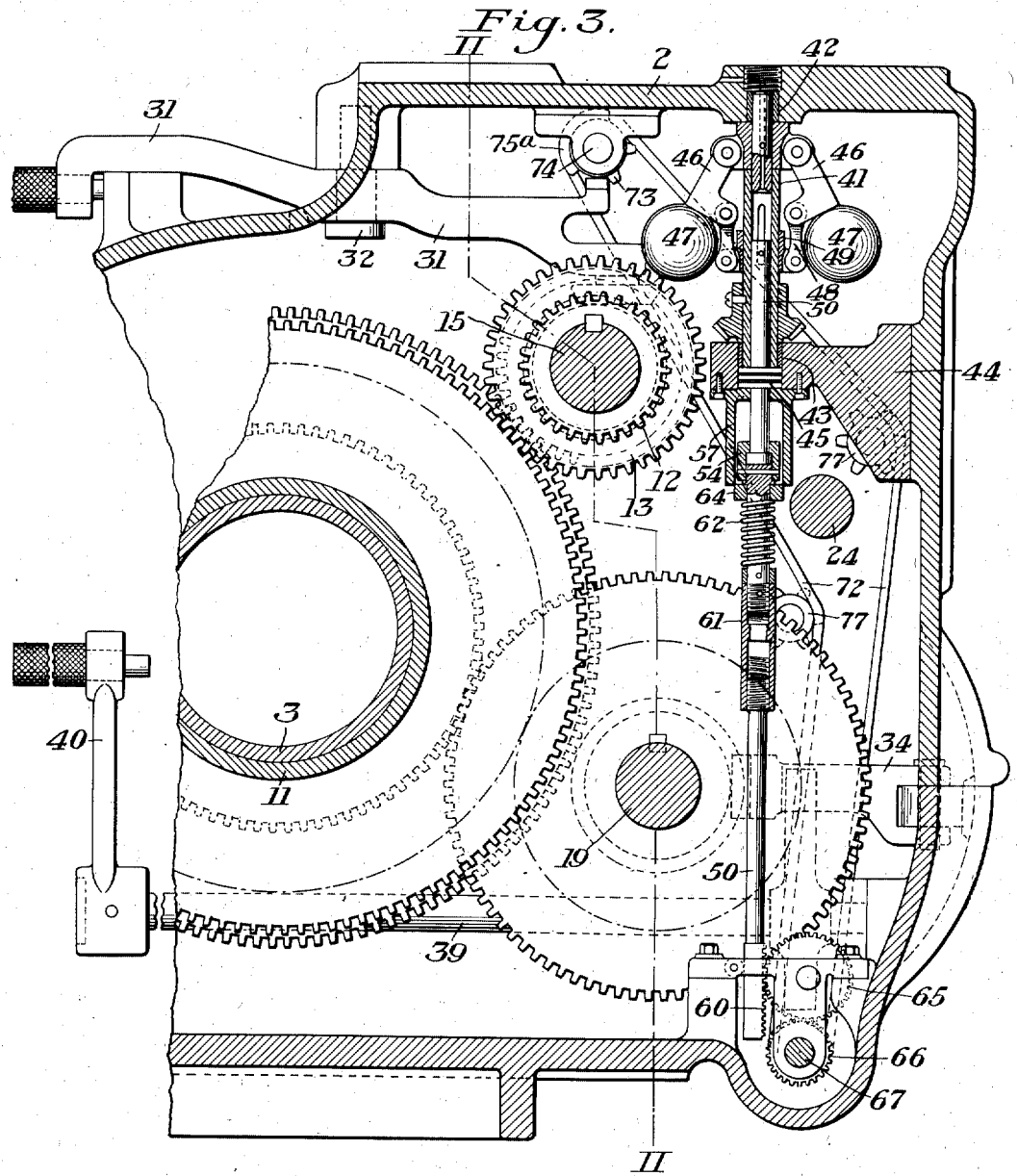

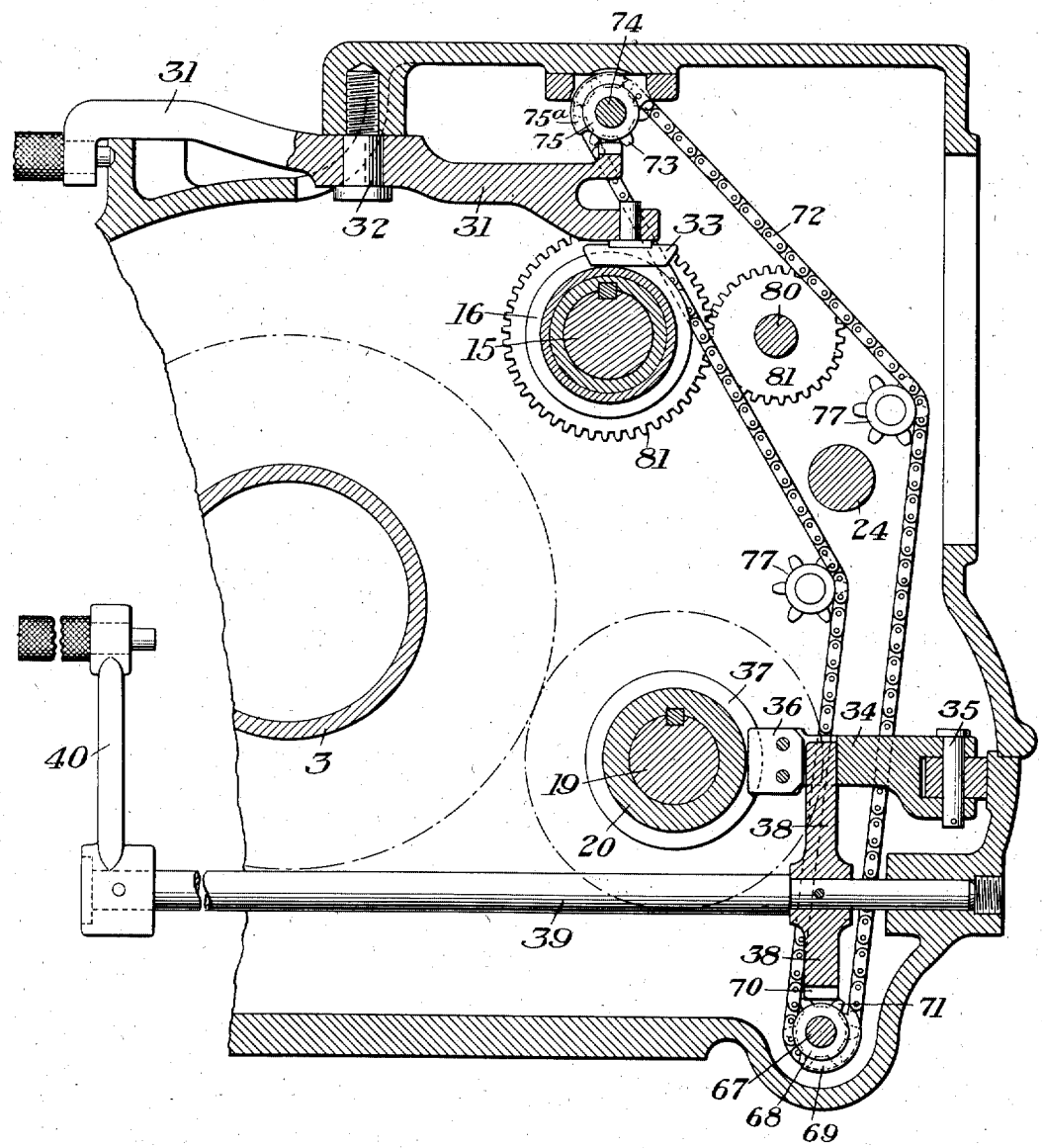

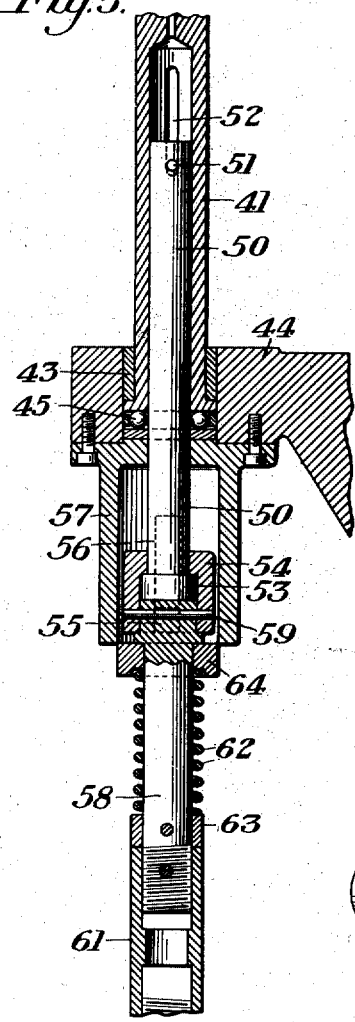
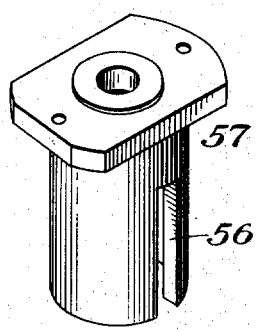
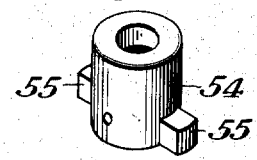
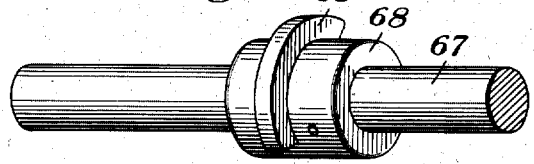
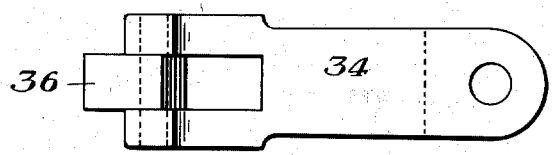

JOHN VAN HAMERSVELD, OF AVALON, PENNSYLVANIA, ASSIGNOR TO THE DUFF MANUFACTURING COMPANY, OF PITTSBURGH, PENNSYLVANIA, A CORPORATION OF PENNSYLVANIA.

LOCKING MECHANISM FOR GEAR-SHIFTS.

1,252,205.   Specification of Letters Patent.   Patented Jan. 1, 1918.

Application filed April 5, 1917. Serial No. 159,868.

*To all whom it may concern:*

Be it known that I, JOHN VAN HAMERSVELD, a citizen of the United States, residing at Avalon, Allegheny county, Pennsylvania, have invented a new and useful Improvement in Locking Mechanism for Gear-Shifts, of which the following is a full, clear, and exact description, reference being had to the accompanying drawings, forming part of this specification, in which—

Fig. 2 is a section on the irregular line II—II of Fig. 3.

Figs. 3 and 4 are sectional views taken, respectively, on the irregular lines III—III and IV—IV of Fig. 2.

Fig. 5 is a detail view showing a portion of the governor-actuated mechanism in vertical section.

Figs. 6, 7 and 8 are detail perspective views of parts of the mechanism, and

Fig. 9 is a plan view of one of the clutch shifting arms.

Figure 1:
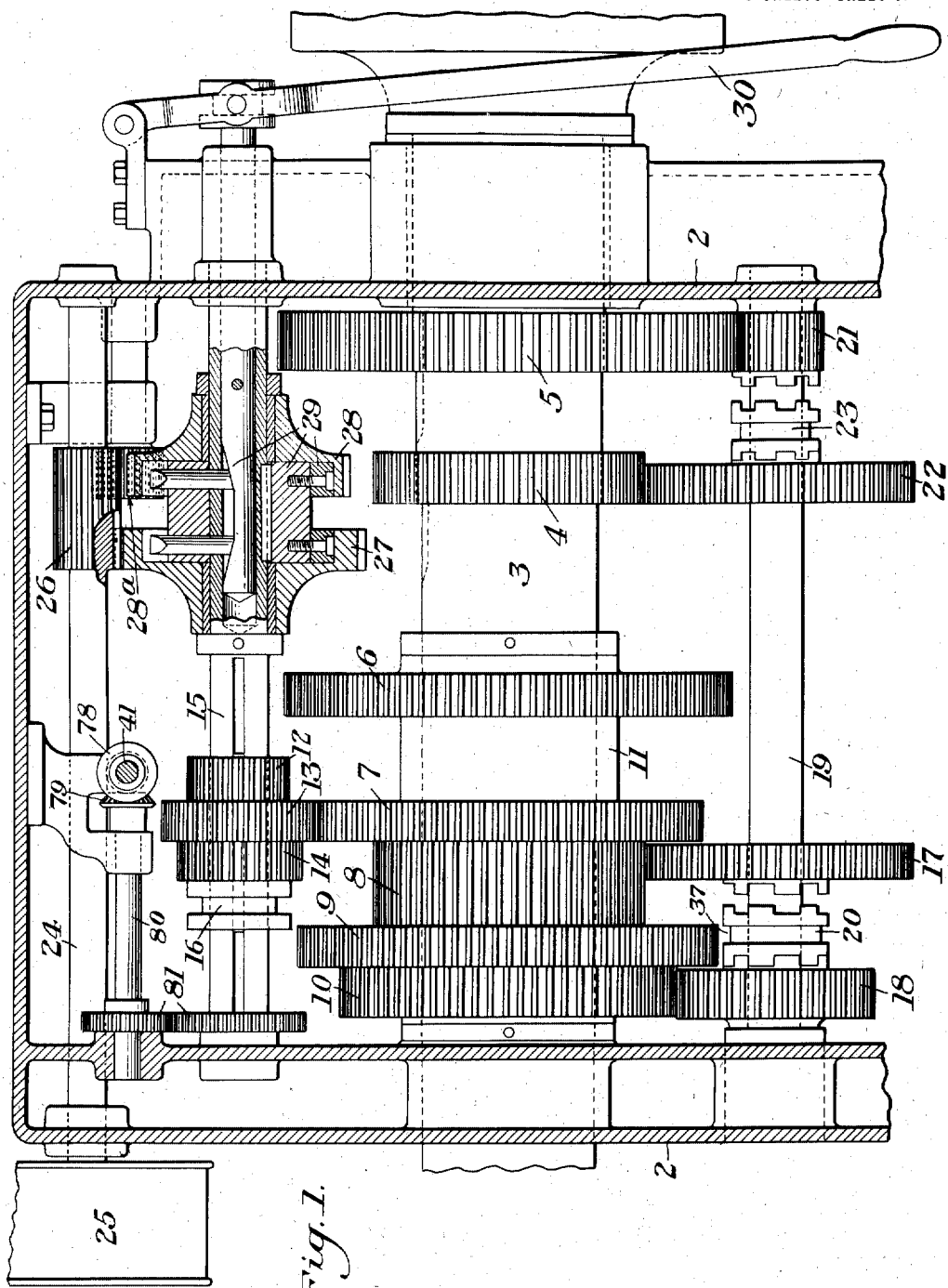
Figure 1 is a development, partly in plan and partly in horizontal section, showing a portion of the headstock of a lathe, and the lathe gears.

My invention has relation to locking mechanisms for gear shifts. In the accompanying drawings I have illustrated my invention as applied to change speed gears of a lathe, the mechanism being located inside the headstock of the lathe. My invention is, however, applicable to other change speed gearing.

The object of my invention is to provide a simple and efficient device for preventing the gears from being shifted while the gears and their controlling clutches are being rotated at a speed sufficiently high to be likely to cause breakage of the gears or injury to the clutches.

The particular nature of my invention will be best understood by reference to the accompanying drawings in which I have shown a preferred embodiment thereof, and which will now be described, it being premised, however, that my invention is susceptible of modification, and that various changes can be made in the details of construction, arrangement and combination of the parts without departing from the spirit and scope of the invention as defined in the appended claims.

In these drawings the numeral 2 designates a portion of the frame of the headstock of the lathe. 3 is the main lathe spindle having the driving gears 4 and 5 fixedly secured thereto. 6, 7, 8, 9 and 10 are a set of change gears which are mounted upon the sleeve 11. 12, 13 and 14 designate a set of shiftable pinions which coöperate, in different positions thereof, with the gears 6, 7 and 9. These gears 12, 13 and 14 are slidably mounted on a main clutch shaft 15, and are controlled by the shifting member 16. 17 and 18 designate gears loosely mounted on a clutch shaft 19, and coöperating with the gears 8 and 10, respectively, in different positions of the controlling clutch 20. 21 and 22 are two other gears loosely mounted on the shaft 19 and adapted, respectively, to drive the gears 4 and 5, according to the position of the clutch 23.

24 is the main driving shaft having the driving pulley 25, and carrying the pinion 26 for driving directly through the gear 27 and the reverse gear 28 on the shaft 15 through an idler gear 28ª, these gears 27 and 28 being controlled by a clutch 29 actuated by the hand lever 30.

The parts thus far described form no part of my present invention, the latter having to do merely with the control of the shifting mechanism for the clutches 20 and 23 and the shifting member 16, but have been shown in order to illustrate one application of my invention.

The member 16 is shifted on the shaft 15 by means of the shifting arm or lever 31 pivoted at 32 to move in a horizontal plane, as best shown in Figs. 3 and 4. The arm 31 carries the shoe 33 engaging the groove of the shifting member 16.

The clutch 20 is shifted on the shaft 19 by means of a shifting arm 34 pivoted at 35 and having a shoe 36 engaging the groove 37 in the movable clutch member. The arm 34 is shown as being engaged by an arm 38 on a rock shaft 39 provided with an actuating handle 40 (see Fig. 4).

The movable member of the clutch 23 may be provided with shifting mechanism (not shown) in all respects similar to that just described for the movable clutch member 20.

41 designates a vertically placed hollow shaft or sleeve journaled at its upper end portion in the bearing 42, and at its lower end portion in a bearing 43 seated in the bracket 44. At its lower end this shaft 41 preferably rests upon a thrust bearing 45 of the ball type (see Figs. 3 and 5).

Pivoted to the upper portion of the shaft 41 are governor arms 46 carrying the balls 47 and connected by links 48 with a vertically movable sleeve 49 slidably mounted on the shaft 41. The shaft 41 telescopes over the upper end portion of an inner shaft 50, which at its upper end is connected with the sleeve 49 by means of a pin 51 sliding in slots 52 in the shaft 41. The lower end portion of the shaft 50 extends below the thrust bearing 45 and has a head 53 at its lower end which rotatably engages a shoe 54. This shoe has opposite projections 55 (see Figs. 2 and 7) which engage in vertical slots 56 (see Figs. 2 and 6) within a fixed, hollow cylindrical member 57. 58 is another rod member whose upper end extends within the shoe 54 and is connected thereto by the pin 59. The rod member 58 extends downwardly and is provided at its lower end with rack teeth 60. Preferably this member 58 is formed in two parts connected by an adjusting sleeve, or turnbuckle, 61. 62 is a compression spring which is seated around said shaft section between a collar 63 and a fixed upper bearing 64. The purpose of this spring is to retard the rise and hasten the fall of the governor balls 47, thus giving more time for shifting.

The rack teeth 60 mesh with the teeth of a gear wheel 65 which meshes with and drives a pinion 66 on a shaft 67. This shaft 67 has secured thereto a collar 68 (see Figs. 2 and 8) provided with the segmental flange 69 extending over a portion of its circumference. This flange is adapted to slide in either one of the two grooves 70 formed in the end of an extension of the arm 38, before described. Normally, the projection 69 will engage one of said grooves, and thus prevent the arm 38 from being moved to shift its clutch member 20.

Secured to the shaft 67 is a sprocket wheel 71 which is connected by a chain 72 with a similar wheel 73 on a short shaft 74 journaled within the upper portion of the headstock. The shaft 74 is provided with a collar 75 which is similar to the collar 69, its projection 75ª being adapted to engage any one of a number of grooves or slots 76 formed on the gear shifting arm or lever 31, before described (see Figs. 2, 3 and 4). 77 designate toothed idler and guide wheels for the chain 72.

The governor may be driven from any moving part of the lathe. In the drawings I have shown the sleeve 41 as having secured thereto a bevel gear 78 (Figs. 1, 2 and 3) which is driven by a bevel gear 79 on a shaft 80 driven by the gears 81 from the shaft 15.

The operation is as follows: When the lathe gears are moving at a sufficiently high rate of speed to make it dangerous to attempt to shift the gears, the governor balls 47 are elevated, thereby raising the shaft members 50 and 58 against the action of the spring 62 and through the rack teeth 60 rotating the gears 65 and 66 and thereby the shaft 67 a part of a revolution, determined by the vertical travel of the rack teeth. This holds the projections of said collars in locking engagement with the gear shifting arms 31 and 34 and effectively prevents any attempt to shift the gears. When, however, the speed of the parts is sufficiently low to drop the governor balls and thereby rotate the shaft 67 in the reverse direction, the projections of the collars 68 and 75 are moved out of engagement with the shifting arms 31 and 34, and these parts are free to be actuated to shift the clutches.

The function of the chain 72 is simply to transmit the movement of the shaft 67 to the shaft 74 so that the two collars 69 and 75 will move simultaneously through similar arcs.

The shaft 67 may be provided with another key collar (not shown) in all respects similar to the collar 69 and to thereby control the clutch member 23. In fact, it will be readily seen that in applying my invention to different change speed gearings any desired number of clutch locking devices of the character described may be carried by or controlled from a shaft corresponding to the shaft 67.

The advantages of my invention will be apparent, since it provides a simple and effective safety device for preventing the shifting of change gears while they are being rotated at a high speed. The invention is readily applicable to existing lathes, as well as to other change speed gears.

I claim:

1. In mechanism of the character described, the combination of a centrifugal governor, a driving connection between the governor and a moving part of the machine to which the mechanism is applied, a gear shifting member, and a lock for said member, said lock having an actuating engagement with the governor, substantially as described.

2. In mechanism of the character described, the combination with a set of change gears, and a shifting member therefor, of a centrifugal governor, a driving connection for the governor, and a locking device operatively connected with said governor and arranged to be moved by the governor into and out of locking engagement with said shifting member, substantially as described.

3. In mechanism of the character described, the combination with a plurality of sets of change gears, and separate means for shifting each set of such gears, of a locking device for each shifting means, a centrifugal governor, a driving connection for the governor, and means actuated by the governor for simultaneously actuating said devices, substantially as described.

4. In mechanism of the charatcer described, the combinatiton of a pivoted gear shifting member, a locking member arranged to be moved into and out of locking engagement with the gear shifting member, a governor, a driving connection for the governor, and connections actuated by the governor for actuating the locking member, substantially as described.

5. In mechanism of the character described, the combination of a pivoted gear shifting member, a rotatable locking device arranged to be turned into and out of locking engagement with said member, a governor, a driving connection for the governor, and actuating connections between the governor and the locking device, substantially as described.

6. In mechanism of the character described, the combination of a rotatable shaft, a governor, a driving connection for the governor, connections actuated by the governor for rotating the shaft, a plurality of gear shifting members, and means actuated by said shaft for simultaneously locking and releasing the gear shifting members, substantially as described.

7. In mechanism of the character described, the combination of a governor, a driving connection therefor, a rack member arranged to be actuated by the governor, a spring opposing the action of the governor in one direction, and a locking shaft geared to said rack member, substantially as described.

In testimony whereof, I have hereunto set my hand.

JOHN VAN HAMERSVELD.

Witnesses:
T. A. McGINLEY,
M. L. HAYES.